United States Patent [19]

Steppan et al.

[11] Patent Number: 5,277,862
[45] Date of Patent: Jan. 11, 1994

[54] RESIN TRANSFER MOLDING PROCESS

[75] Inventors: David D. Steppan, Gibsonia; Robson M. Mafoti, Pittsburgh, both of Pa.

[73] Assignee: Miles Inc., Pittsburgh, Pa.

[21] Appl. No.: 1,490

[22] Filed: Jan. 7, 1993

[51] Int. Cl.$^5$ ............................................. B29C 45/14
[52] U.S. Cl. .................................. 264/257; 264/328.6; 264/328.18; 264/331.19
[58] Field of Search .................. 264/331.19, 328.18, 264/328.5, 328.6, 257, 240

[56] References Cited

U.S. PATENT DOCUMENTS

| | | | |
|---|---|---|---|
| 4,413,111 | 11/1983 | Markusch et al. | 528/59 |
| 4,440,705 | 4/1984 | Nissen et al. | 264/328.18 |
| 4,582,879 | 4/1986 | Frisch et al. | 264/240 |
| 4,695,509 | 9/1987 | Cordova et al. | 428/267 |
| 4,714,575 | 12/1987 | Preston | 264/257 |
| 4,757,123 | 7/1988 | Younes | 528/53 |
| 4,800,058 | 1/1989 | Younes | 264/328.4 |
| 4,919,876 | 4/1990 | Savage et al. | 264/258 |
| 4,952,358 | 8/1990 | Okina et al. | 264/328.6 |
| 5,009,821 | 4/1991 | Weaver | 264/22 |
| 5,071,613 | 12/1991 | Fukami et al. | 264/328.6 |
| 5,071,939 | 12/1991 | Fukami et al. | 264/257 |
| 5,100,735 | 3/1992 | Chang | 427/409 |
| 5,187,001 | 2/1993 | Brew | 264/328.6 |

FOREIGN PATENT DOCUMENTS

| | | | |
|---|---|---|---|
| 60-159031 | 8/1985 | Japan | 264/331.19 |
| 62-207315 | 9/1987 | Japan | 264/331.19 |

OTHER PUBLICATIONS

E. B. Stark & W. V. Breitigam, "Resin Transfer Molding Materials," Engineered Materials Handbook, vol. 1 ("Composities") (Metals Park, Ohio: ASM International, 1987), pp. 168–171.

C. F. Johnson, "Resin Transfer Molding," Engineered Materials Handbook, vol. 1 ("Composities") (Metals Park, Ohio: ASM International, 1987), pp. 565–568.

G. R. Smoluk, Modern Plastics, 66, 57–65 (Jan., 1989).

J. K. Rogers, Plastics Technology, 35, 50–58 (1989).

R. V. Wilder, Modern Plastics, 66, 48–50, (Jul., 1989).

*Primary Examiner*—Jeffery Thurlow
*Attorney, Agent, or Firm*—Joseph C. Gil; Richard E. L. Henderson

[57] ABSTRACT

This invention relates to a process for preparing polyurethanes by reacting, in accordance with the resin transfer molding technique at an isocyanate index of about 80 to about 120, (a) an organic polyisocyanate;

(b) about 60 to about 98 percent by weight, based on the total amount of components (b) and (c), of at least one isocyanate-reactive compound containing at least two isocyanate-reactive hydrogen atoms and having a molecular weight of from about 400 to about 10,000;

(c) about 2 to about 40 percent by weight, based on the total amount of components (b) and (c), of (i) 2-methyl-1,3-propanediol or (ii) a mixture of 2-methyl-1,3-propanediol with (1) up to about 30% by weight, based on the total amount of component (c), of a chain extender other than 2-methyl-1,3-propanediol and/or (2) up to about 5% by weight, based on the total amount of component (c), of a crosslinking agent; and (d) one or more catalysts and, optionally, one or more other auxiliaries and/or additives.

13 Claims, No Drawings

RESIN TRANSFER MOLDING PROCESS

BACKGROUND OF THE INVENTION

This invention relates to a resin transfer molding process in which the use of 2-methyl-1,3-propanediol as the chain extender provides polyurethane elastomers having excellent and unexpected physical properties.

Resin transfer molding is a form of liquid composite molding in which the reaction conditions typically involve longer reaction times, lower temperatures, and lower pressures than the commonly used reaction injection molding ("RIM") technique. In fact, open molds are often suitable for resin transfer molding. Consequently, resin transfer molding is particularly suited to the production of fiber-reinforced plastic articles, for which wetting and impregnation of the reinforcement material is often difficult, and the production of very large articles, for which the high pressure molds used in the RIM technique are impractical or unavailable. See, e.g., E. B. Stark and W. V. Breitigam, "Resin Transfer Molding Materials," and C. F. Johnson, "Resin Transfer Molding," in *Engineered Materials Handbook*, Vol 1 ("Compositites") (Metals Park, Ohio: ASM International, 1987), pages 168–171 and 565–568, respectively; G. R. Smoluk, *Modern Plastics*, 66, 57–65 (January, 1989); J. K. Rogers, *Plastics Technology*, 35, 50–58 (1989); and R. V. Wilder, *Modern Plastics*, 66, 48–50 (July, 989).

Although the resin transfer molding technique has most commonly been used for polymers other than polyurethanes, the technique can also be used with reactive urethane-based systems. For example, U.S. Pat. Nos. 4,695,509, 4,919,876, and 5,009,821 disclose the preparation of polyurethane composites by resin transfer molding and U.S. Pat. Nos. 4,757,123 and 4,800,058 disclose the preparation of modified rigid polyisocyanurate polymer compositions by resin transfer molding.

An object of the present invention was to find a process for preparing elastomers that gives higher quality product and is more easily controlled than open-mold casting techniques and that, when used to prepare reinforced products, is less likely to disturb or damage the reinforcing materials than reaction injection molding techniques. The present invention provides polyurethane elastomers having unexpectedly high elongation values and high resiliency to compression in combination with overall good physical properties when compared with elastomers extended with 1,4-butanediol using the standard molding techniques.

SUMMARY OF THE INVENTION

This invention relates to a process for preparing polyurethanes comprising reacting, in accordance with the resin transfer molding technique at an isocyanate index of about 80 to about 120, (a) an organic polyisocyanate;
(b) about 60 to about 98 percent by weight, based on the total amount of components (b) and (c), of at least one isocyanate-reactive compound containing at least two isocyanate-reactive hydrogen atoms and having a molecular weight of from about 400 to about 10,000;
(c) about 2 to about 40 percent by weight, based on the total amount of components (b) and (c), of (i) 2-methyl-1,3-propanediol or (ii) a mixture of 2-methyl-1,3-propanediol with (1) up to about 30% by weight, based on the total amount of component (c), of a chain extender other than 2-methyl-1,3-propanediol and/or (2) up to about 25% by weight, based on the total amount of component (c), of a crosslinking agent; and
(d) one or more catalysts and, optionally, one or more other auxiliaries and/or additives.

DETAILED DESCRIPTION OF THE INVENTION

Suitable organic polyisocyanates (a) for carrying out the process of the invention include aliphatic, cycloaliphatic, araliphatic, aromatic, and heterocyclic polyisocyanates of the type described, for example, by W. Siefken in *Justus Liebigs Annalen der Chemie*, 562, pages 75 to 136. Such isocyanates include those having the formula Q(NCO)$_n$ in which n is a number from 2 to about 5 (preferably 2 to 3) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane ("isophorone diisocyanate"; see, e.g. German Auslegeschrift 1,202,785 and U.S. Pat. No. 3,401,190); 2,4- and 2,6-hexahydrotoluene diisocyanate and mixtures of these isomers; hexahydro-1,3- and/or -1,4-phenylene diisocyanate; dicyclohexylmethane-4,4'-diisocyanate ("hydrogenated MDI", or "HMDI"); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation ("crude MDI"), which are described, for example, in British Patents 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in British Patent 889,050; polyisocyanates obtained by telomerization reactions of the type described, for example, in U.S. Pat. No. 3,654,106; polyisocyanates containing ester groups of the type described, for example, in British Patents 965,474 and 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. It is also possible to use mixtures of the polyisocyanates described above.

In general, it is preferred to use unbranched diisocyanates (such as TDI and MDI), corresponding modified diisocyanates, and prepolymers prepared from such diisocyanates. Aromatic diisocyanates are generally preferred over aliphatic diisocyanates. Isocyanate-containing prepolymers prepared from aromatic diisocyanates are especially preferred. A particularly preferred polyisocyanate is an isocyanate prepolymer having an isocyanate content of 22.6% prepared from MDI and tripropylene glycol.

Suitable isocyanate-reactive compounds (b) according to the invention contain at least two isocyanate-reactive hydrogen atoms and include compounds containing hydroxyl groups, amino groups, thiol groups, carboxyl groups, or a combination thereof, with the preferred compounds being those containing hydroxyl groups. Suitable such compounds are described, for example, in German Offenlegungsschrift 2,832,253 at pages 11 to 20.

Preferred isocyanate-reactive compounds contain on average 2 to 8 (preferably 2 to 4) hydroxyl groups and have a molecular weight of from 400 to 10,000 (most preferably 2000 to 6000), including for example, hydroxyl-containing polyethers, polyesters, polyacetals, polycarbonates, polyesterethers, polythioethers, polyamides, polyesteramides, polysiloxanes, polybutadienes, and polyacetones, and can optionally contain one or more isocyanate-reactive amino groups. Preferred hydroxyl-containing compounds contain 2 to 3 reactive hydroxyl groups or, less preferably, a combination of 1 to 3 reactive hydroxyl groups and 1 to 3 reactive primary or secondary amino groups. Particularly preferred hydroxyl-containing compounds include polyethers or polyesters having on average 2 to 2.2 (preferably 2) isocyanate-reactive hydroxyl groups.

Suitable hydroxyl-containing polyethers are known and may be prepared, for example, by the polymerization of epoxides such as ethylene oxide, propylene oxide, butylene oxide, tetrahydrofuran, styrene oxide, or epichlorohydrin, optionally in the presence of BF$_3$, or by chemical addition of such epoxides, optionally as mixtures or successively, to starting components containing reactive hydrogen atoms, such as water, alcohols, or amines. Examples of such starting components include ethylene glycol, 1,3- or 1,2-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Auslegeschriften 1,176,358 and 1,064,938 may also be used according to the invention. Polyethers that contain predominantly primary hydroxyl groups (up to about 90%, by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152,536) are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol.

Suitable hydroxyl-containing polyesters include reaction products of polyhydric alcohols (preferably diols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g., by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable polyhydric alcohols include ethylene glycol, 1,2- and 1,3-propanediol, 1,4- and 2,3-butanediol, 1,6-hexanediol, 1,8-octanediol, neopentyl glycol, cyclohexafiedimethanol, 1,4-bis(hydroxymethyl)cyclohexane, 2-methyl-1,3-propanediol, glycerol, trimethylolpropane, 1,2,6-hexanetriol, 1,2,4-butanetriol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, and polybutylene glycols. The polyesters may also contain a proportion of carboxyl end groups. Polyesters of lactones, such as $\epsilon$-caprolactone, or of hydroxycarboxylic acids, such as $\omega$-hydroxycaproic acid, may also be used. Hydrolytically stable polyesters are preferably used in order to obtain the greatest benefit relative to the hydrolytic stability of the final product. Preferred polyesters include polyesters obtained from adipic acid or isophthalic acid and straight chained or branched diols, as well as lactone polyesters, preferably those based on caprolactone and diols.

Suitable polyacetals include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Suitable polycarbonates include those prepared by the reaction of diols, such as 1,3-propanediol, 1,4-butanediol, 1,6-hexanediol, diethylene glycol, triethylene glycol, tetraethylene glycol, or thiodiglycol, with phosgene or diaryl carbonates such as diphenyl carbonate (German Auslegeschriften 1,694,080, 1,915,908, and 2,221,751; German Offenlegungsschrift 2,605,024).

Suitable polythioethers include the condensation products obtained by the reaction of thiodiglycol, either alone or with other glycols, dicarboxylic acids, formaldehyde, aminocarboxylic acids, or amino alcohols. The products obtained are polythio-mixed ethers, polythioether esters, or polythioether ester amides, depending on the components used.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamines, and mixtures thereof.

Other suitable hydroxyl-containing compounds include polyhydroxyl compounds already containing urethane or urea groups and modified or unmodified natural polyols. Products of addition of alkylene oxides to phenol-formaldehyde resins or to urea-formaldehyde resins are also suitable. Furthermore, amide groups may be introduced into the polyhydroxyl compounds as described, for example, in German Offenlegungsschrift 2,559,372.

Polyhydroxyl compounds in which polyadducts or polycondensates or polymers are present in a finely dispersed or dissolved form may also be used according to the invention, provided that the molecular weights range from about 400 to about 10,000. Polyhydroxyl compounds of this type may be obtained, for example, by carrying out polyaddition reactions (e.g., reactions between polyisocyanates and amino functional compounds) or polycondensation reactions (e.g., between formaldehyde and phenols or amines) in situ in the above-mentioned hydroxyl-containing compounds. Processes of this type are described, for example, in German Auslegeschriften 1,168,075 and 1,260,142 and German Offenlegungsschriften 2,324,134, 2,423,984, 2,512,385, 2,513,815, 2,550,796, 2,550,797, 2,550,833, 2,550,862, 2,633,293, and 2,639,254. Suitable compounds may also be obtained according to U.S. Pat. Nos. 3,869,413 or 2,550,860 by mixing a previously prepared aqueous polymer dispersion with a polyhydroxyl compound and then removing water from the mixture.

Polyhydroxyl compounds modified with vinyl polymers, such as those obtained, for example, by the polymerization of styrene and acrylonitrile in the presence of polycarbonate polyols (German Patentschrift 1,769,795 and U.S. Pat. No. 3,637,909) are also suitable for the process of the invention. Synthetic resins with exceptional flame resistance may be obtained by using polyether polyols that have been modified by graft polymerization with vinyl phosphonic acid esters and optionally acrylonitrile, methacrylonitrile, acrylamide, methacrylamide, or hydroxy-functionalized acrylic or methacrylic acid esters according to German Offenlegungsschriften 2,442,101, 2,644,922, and 2,646,141.

Suitable, although less preferred, hydroxyl-containing compounds include organofunctional polysiloxanes containing two terminal isocyanate-reactive groups and structural units of the formula 13 O13 Si(R)$_3$ in which R denotes a $C_1$–$C_4$ alkyl group or a phenyl group, preferably a methyl group. Both the known, pure polysiloxanes containing organofunctional end groups and the known siloxane polyoxyalkylene copolymers containing organofunctional end groups are suitable starting materials according to the invention.

Also suitable are so-called amine terminated polyethers containing primary or secondary (preferably primary) aromatically or aliphatically (preferably aliphatically) bound amino groups. Compounds containing amino end groups can also be attached to the polyether chain through urethane or ester groups. These amine terminated polyethers can be prepared by any of several methods known in the art. For example, amine terminated polyethers can be prepared from polyhydroxyl polyethers (e.g., polypropylene glycol ethers) by a reaction with ammonia in the presence of Raney nickel and hydrogen (Belgian Patent 634,741). Polyoxyalkylene polyamines can be prepared by a reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in German Patentschrift 1,193,671. Other methods for the preparation of polyoxyalkylene (polyether) amines are described in U.S. Pat. Nos. 3,155,728 and 3,236,895 and in French Patent 1,551,605. French Patent 1,466,708 discloses the preparation of polyethers containing secondary amino end groups. Also useful are the polyether polyamines described in U.S. Pat. Nos. 4,396,729, 4,433,067, 4,444,910, and 4,530,941.

Relatively high molecular weight polyhydroxypolyethers suitable for the process of the present invention may be converted into the corresponding anthranilic acid esters by reaction with isatoic acid anhydride. Methods for making polyethers containing aromatic amino end groups are disclosed in German Offenlegungsschriften 2,019,432 and 2,619,840 and U.S. Pat. Nos. 3,808,250, 3,975,428, and 4,016,143. Relatively high molecular weight compounds containing amino end groups may also be obtained according to German Offenlegungsschrift 2,546,536 or U.S. Pat. No. 3,865,791 by reacting isocyanate prepolymers based on polyhydroxyl polyethers with hydroxyl-containing enamines, aldimines, or ketimines and hydrolyzing the reaction product.

Aminopolyethers obtained by the hydrolysis of compounds containing isocyanate end groups are preferred amine terminated polyethers. For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645, European Patent Application 97,299, and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, and 4,931,595.

Other suitable amine terminated polyethers include aminophenoxy-substituted polyethers described, for example, in European Patent Applications 288,825 and 268,849 and U.S. application Ser. No. 07/266,725 (filed Nov. 3, 1988).

The amine terminated polyethers used in the present invention are in many cases mixtures with any of the above-mentioned compounds. These mixtures generally should contain (on a statistical average) two to three isocyanate reactive amino end groups.

General discussions of representative hydroxyl-containing compounds that may be used according to the present invention can be found, for example, in *Polyurethanes, Chemistry and Technology* by Saunders and Frisch, Interscience Publishers, New York, London, Volume I, 1962, pages 32–42 and pages 44–54, and Volume II, 1964, pages 5–6 and 198–199, and in *Kunststoff-Handbuch*, Volume VII, Vieweg-Höchtlen, Carl-Hanser-Verlag, Munich, 1966, on pages 45 to 71.

Component (c) is preferably only 2-methyl-1,3-propanediol. However, although not essential to the practice of the invention, it is often desirable to include chain-extending agents other than 2-methyl-1,3-propanediol. Suitable such other chain-extending agents include compounds having two isocyanate-reactive hydrogen atoms and having a molecular weight of from 32 to 399. Suitable chain-extending agents can contain hydroxyl groups, amino groups, thiol groups, and/or carboxyl groups but those containing only hydroxyl groups are preferred. Suitable hydroxyl-containing chain extenders include diols, such as 1,2-ethanediol, 1,2- and 1,3-propylene glycol, 1,4- and 2,3-butylene glycol, 1,6-hexanediol, 1,8-octanediol, neopentyl glycol, cyclohexanedimethanol, and 1-methyl-1,3-propanediol. Although less preferred, chain extenders containing amino groups can be used. Suitable amine chain extenders contain exclusively aromatically bound primary or secondary (preferably primary) amino groups and preferably also contain alkyl substituents. Examples of such amines include 1,4-diaminobenzene, 2,4-diaminotoluene, 2,4'- and/or 4,4'-diaminodiphenylmethane, 3,3'-dimethyl-4,4'-diaminodiphenylmethane, 1-methyl-3,5-bis(methylthio)-2,4- and/or -2,6-diaminobenzene, 1,3,5-triethyl-2,4-diaminobenzene, 1,3,5-triisopropyl-2,4-diaminobenzene, 1-methyl-3,5-diethyl-2,4- and/or -2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane, and 3,5-diethyl-3',5'-diisopropyl-4,4'-diaminodiphenylmethane. Such compounds may, of course, also be used as mixtures.

Crosslinking agents, although not preferred, can also be used in addition to 2-methyl-1,3-propanediol. Suitable crosslinking agents include compounds having more than two isocyanate-reactive hydrogen atoms and having a molecular weight of from 32 to 399. Suitable crosslinking agents, if used at all, can contain hydroxyl groups, amino groups, thiol groups, and/or carboxyl groups. Suitable hydroxyl-containing crosslinkers include polyols, such as glycerol, trimethylolpropane, 1,2,6-hexanetriol, 1,2,4-butanetriol, and trimethylolethane. Although less preferred, crosslinkers containing amino groups can be used. Suitable amine chain extenders contain exclusively aromatically bound primary or secondary (preferably primary) amino groups and preferably also contain alkyl substituents. Such compounds may, of course, also be used as mixtures.

The quantities of isocyanate-reactive components (b) and (c) are selected such that together they consist of, relative to their combined amount, about 60 to about 98 percent by weight (preferably 70 to 95 percent by weight) of component (b) and about 2 to about 40 percent by weight (preferably 5 to 30 percent by weight) of 2-methyl-1,3-propanediol or a mixture of 2-methyl-1,3-propanediol with another chain extender and/or a crosslinking agent. It is possible to use up to about 30% by weight, based on the total amount of component (c), of a chain extender other than 2-methyl-1,3-propanediol and/or up to about 25% by weight, based on the total amount of component (c), of a crosslinking agent. However, it is particularly preferred to use 2-methyl-1,3-propanediol as the only chain extender and to use no crosslinking agents.

Suitable catalysts include tertiary amines such as triethylamine, tributylamine, N-methylmorpholine, N-ethylmorpholine, N,N,N',N'-tetramethylethylene diamine, pentamethyldiethylene triamine, and higher homologs (German Offenlegungsschriften 2,624,527 and 2,624,528), 1,4-diazabicyclo[2.2.2]octane, N-methyl-N'-(dimethylaminoethyl)piperazine, bis(dimethylaminoalkyl)piperazines (German Offenlegungsschrift 2,636,787), N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-$\beta$-phenylethylamine, 1,2-dimethylimidazole, 2-methylimidazole, monocyclic and bicyclic amidines (German Offenlegungsschrift 1,720,633), bis(dialkylamino)alkyl ethers (U.S. Pat. No. 3,330,782, German Auslegeschrift 030,558, and German Offenlegungsschriften 1,804,361 and 2,618,280), and tertiary amines containing amide groups (preferably formamide groups) according to German Offenlegungsschriften 2,523,633 and 2,732,292. The catalysts used may also be the known Mannich bases of secondary amines (such as dimethylamine) and aldehydes (preferably formaldehyde) or ketones (such as acetone) and phenols.

Other suitable catalysts include certain tertiary amines containing isocyanate reactive hydrogen atoms. Examples of such catalysts include triethanolamine, triisopropanolamine, N-methyldiethanolamine, N-ethyldiethanolamine, N,N-dimethylethanolamine, their reaction products with alkylene oxides (such as propylene oxide and/or ethylene oxide) and secondary-tertiary amines according to German Offenlegungsschrift 2,732,292.

Sila-amines containing carbon-silicon bonds, although not preferred, may also be used as catalysts, for example, those described in German Patentschrift 1,229,290 (believed to correspond to U.S. Pat. No. 3,620,984). Examples of suitable sila-amines include 2,2,4-trimethyl-2-silamorpholine and 1,3-dimethylaminomethyl tetramethyldisiloxane.

Suitable catalysts also include nitrogen-containing bases, such as tetraalkylammonium hydroxides; alkali metal hydroxides, such as sodium hydroxide; alkali metal phenolates, such as sodium phenolate; and alkali metal alcoholates, such as sodium methoxide. Hexahydrotriazines (German Offenlegungsschrift 1,709,043) and tertiary amines containing amide groups (preferably formamide groups) (German Offenlegungsschriften 2,523,633 and 2,732,292) may also be used as catalysts. Known Mannich bases of secondary amines (such as dimethylamine) and aldehydes (preferably formaldehyde) or ketones (such as acetone) and phenols may also be used as catalysts.

Other suitable catalysts include organic metal compounds, especially organic tin compounds. Suitable organic tin compounds include those containing sulfur, such as dioctyl tin mercaptide (German Auslegeschrift 1,769,367 and U.S. Pat. No. 3,645,927), and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate.

Particularly preferred catalysts include delayed action catalysts, which are tin-based catalysts or acid-blocked amine catalysts. Examples of suitable delayed action catalysts include TOPCAT 170, TOPCAT 190, and TOPCAT 290 tin-based catalysts (available from Tylo Industries, Parsippany, N.J.), DABCO 8154 and DABCO BL-17 catalysts based on 1,4-diazabicyclo[2.2.2]octane (available from Air Products and Chemicals, Inc., Allentown, Pa.), and POLYCAT SA-1, POLYCAT SA-102, and POLYCAT SA-610/50 catalysts based on POLYCAT DBU amine catalyst (available from Air Products and Chemicals, Inc.).

Any of the above-mentioned catalysts may, of course, be used as mixtures.

Further representatives of catalysts to be used according to the invention and details concerning their mode of action are described in Kunststoff Handbuch, Volume VII, published by Vieweg and Höchtlen, Carl-Hanser-Verlag, Munich, 1966, for example, on pages 96 to 102.

The catalysts are generally used in a quantity ranging from about 0.01 to about 3% by weight, based on the total quantity of the reactants, the exact quantity depending on the particular catalyst used.

Auxiliary agents and additives other than catalysts may also be used in the process of the invention. Suitable auxiliary agents and additives may include, for example, internal mold release agents, blowing agents, surface-active additives, cell regulators, pigments, dyes, UV stabilizers, plasticizers, fungistatic or bacteriostatic substances, and fillers, such as those described in European Patent Application 81,701 at column 6, line 40, to column 9, line 31. When used at all, the preferred auxiliary agents and additives include known fillers and/or reinforcing materials, such as barium sulfate, kieselguhr, whiting, mica, and especially glass fibers, liquid crystal fibers, glass flakes, glass balls, aramide fibers, and carbon fibers. These fillers and/or reinforcing materials may be added to one or more of the reactive components in quantities of up to 80% by weight (preferably up to 40% by weight) based on the total quantity of filled or reinforced polymer product.

Reinforcing materials can, of course, be separately placed in the molds before adding the reactive components. When separately placed in the molds, the reinforcing materials are preferably used as mats or sheets. The reinforcing materials may be oriented strands, random strands, chopped strands, rovings, or any other suitable form. Typical materials from which suitable mats or sheets can be made include glass fibers, polyester fibers, aramide fibers, liquid crystal fibers, and carbon fibers.

The equipment and techniques used for resin transfer molding differ significantly from those used for structural RIM processing. In resin transfer molding, for example, reactants are mixed using static or motionless mixers rather than high speed/high impingement mixers. Injection times for resin transfer molding are typically 30 seconds to 15 minutes, as opposed to about 1 to 5 seconds for the RIM process, and gel times are typically 20 to 40 minutes, as opposed to 5 to 30 seconds for the RIM process. Injection pressures for resin transfer molding are typically only 10 to 100 psi (about 0.07–0.7 MPa), as opposed to about 1000 to 3000 psi (about 7 to 21 MPa) for structural RIM processes. Consequently, it is possible to use less sophisticated injectors, simpler molds, and smaller mold clamps. However, whereas typical structural RIM molds are essentially self-sealing and only passively vented, resin transfer molds typically require a gasketed seal because of the long gel times and are fitted with manually operated vents to permit overfilling to remove air and wet any reinforcing mats.

The temperature at which the process of the invention is carried out is generally not critical but the mold temperature is preferably about 20° C. to about 100° C.

When carrying out the process of the invention, the polyurethane-forming reaction components may be reacted by the known one-stage process, by the prepolymer process, or by the semiprepolymer process. Machines suitable for the process are described, for example, by J. K. Rogers, Plastics Technology, 66, 50–58 (1989). See also G. R. Smoluk, Modern Plastics, 35, 57–65 (January, 1989), and R. V. Wilder, Modern Plastics, 66, 48–50 (July, 1989).

In the one-stage (or "one-shot") method, the isocyanate-reactive components (b) and (c), as well as the catalyst and any of the optional additives and auxiliaries, are combined and thoroughly blended in a premix. The organic polyisocyanate is then mixed with the premix in an appropriate resin transfer molding machine. External release agents, such as silicone oils, are often used during the molding process. It is, however, also possible to use so-called "internal release agents", optionally in admixture with external release agents, as described, for example, in German Offenlegungsschriften 2,121,670 and 2,307,589.

In the prepolymer method, a prepolymer is formed by reacting the polyisocyanate with a portion of the isocyanate-reactive component (b) or a blend of component (b) with a portion of component (c). The prepolymer is then allowed to react with the balance of the isocyanate-reactive components in the resin transfer molding machine.

The semiprepolymer method is similar to the prepolymer method except that a portion of the organic polyisocyanate remains unreacted. That is, the isocyanate component is a mixture of unreacted polyisocyanate and true prepolymer. As in the prepolymer method, the semiprepolymer is then allowed to react with the balance of the isocyanate-reactive components to form the polyurethane elastomer product.

Regardless of the method used, the reactive components are used in quantities such that the isocyanate index is from about 80 to about 120 (preferably 95 to 105). By "isocyanate index" is meant the quotient of the number of isocyanate groups divided by the number of isocyanate-reactive groups, multiplied by 100.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following reactive components were used in the Examples for the preparation of polyurethane elastomers.

Polyol A—a glycerol-started polyether of propylene oxide and ethylene oxide (88 wt. % propylene oxide and 12 wt. % ethylene oxide) having a hydroxyl number of 28 (molecular weight about 6000) and a primary OH content of approximately 90% based on the total OH content of the polyether polyol.

Polyol B—a glycerol-started polyether of propylene oxide and ethylene oxide (83 wt. % propylene oxide and 17 wt. % ethylene oxide) having a hydroxyl number of 35 (molecular weight about 4800) and a primary OH content of approximately 90% based on the total OH content of the polyether polyol.

Polyol C—a glycerol-started polyether of propylene oxide having a hydroxyl number of 56 (molecular weight about 3000) and a primary OH content of approximately 0% based on the total OH content of the polyether polyol.

Polyol D—a glycerol-started polyether of propylene oxide having a hydroxyl number of 56 (molecular weight about 2000) and a primary OH content of approximately 0% based on the total OH content of the polyether polyol.

Isocyanate A—a prepolymer having an isocyanate content of 22.6% prepared from diphenylmethane-4,4'- and/or -2,4'-diisocyanate (98:2 isomer ratio) and tripropylene glycol (available as MONDUR PF from Miles Inc., Pittsburgh, Pa.)

The resin transfer molding machine used for the Examples employed Zenith gear pumps (available from Parker Hannifin Corp., Sanford, N.C.) as the liquid delivery system and a TAH Industries 550 Series Mix Gun and TAH 160-632 motionless mixer (available from TAH Industries, Robbinsville, N.J.).

Reaction parameters are summarized in Table 1. Physical properties are summarized in Table 2.

EXAMPLE 1

A polyol blend was prepared using 93.5 wt. % of Polyol A, 6 wt. % of 2-methyl-1,3-propanediol, and 0.5 wt. % of TOPCAT 290 catalyst (a tin-containing catalyst available commercially from Tylo Industries (Parsippany, N.J.). The polyol blend and Isocyanate A were processed in the resin transfer molding machine at an isocyanate index of 105 (which required a polyol/isocyanate weight ratio of 2.83:1.0) using a mold temperature of 70° C., a shot time of four minutes, and a demold time of six minutes. The molded part (ca. 2000 g) had excellent green strength and resilience. The resultant elastomer exhibited high elongation and a low compression set.

EXAMPLE 2

A polyol blend was prepared using 90.5 wt. % of Polyol B, 9 wt. % of 2-methyl-1,3-propanediol, and 0.5 wt. % of TOPCAT 290 catalyst. The polyol blend and Isocyanate A were processed as in Example 1 (except that a polyol/isocyanate weight ratio of 1.99:1.0 was required to obtain the isocyanate index of 105) using a shot time of two minutes and a demold time of five minutes. The resultant elastomer exhibited high elongation and a low compression set.

EXAMPLE 3 (COMPARISON)

A polyol blend was prepared using 93.5 wt. % of Polyol A, 6 wt. % of 1,4-butanediol, and 0.5 wt. % of TOPCAT 290 catalyst. The polyol blend and Isocyanate A were processed as in Example 1 except for using a mold temperature of 70° C. The resultant elastomer exhibited a higher compression set than the elastomers of Examples 1 and 2.

EXAMPLE 4 (COMPARISON)

A polyol blend was prepared using 93.5 wt. % of Polyol B, 6 wt. % of 1,4-butanediol, and 0.5 wt. % of TOPCAT 290 catalyst. The polyol blend and Isocyanate A were processed as in Example 1 (except that a polyol/isocyanate weight ratio of 2.66:1.0 was required to obtain the isocyanate index of 105) using a shot time of two minutes and a demold time of five minutes. The resultant elastomer exhibited lower elongation and a higher compression set than the elastomers of Examples 1 and 2.

EXAMPLE 5 (COMPARISON)

A polyol blend was prepared using 93.5 wt. % of Polyol C, 6 wt. % of 1,4-butanediol, and 0.5 wt. % of TOPCAT 290 catalyst. The polyol blend and Isocyanate A were processed as in Example 1 (except that a polyol/isocyanate weight ratio of 2.30:1.0 was required to obtain the isocyanate index of 105) using a shot time of two minutes and a demold time of six minutes. The resultant elastomer exhibited very low elongation and a higher compression set than the elastomers of Examples 1 and 2.

EXAMPLE 6 (COMPARISON)

A polyol blend was prepared using 93 wt. % of Polyol D, 6 wt. % of 1,4-butanediol, and 1.0 wt. % of TOPCAT 290 catalyst. The polyol blend and Isocyanate A were processed as in Example 1 (except that a polyol/isocyanate weight ratio of 2.24:1.0 was required to obtain the isocyanate index of 105) using a mold temperature of 70° C., a shot time of two minutes, and a demold time of twelve minutes. The resultant elastomer exhibited very low elongation and a higher compression set than the elastomers of Examples 1 and 2.

TABLE 1

Reaction parameters.

| | Example | | | | | |
|---|---|---|---|---|---|---|
| | 1 | 2 | 3 | 4 | 5 | 6 |
| Polyol blend (wt. %) | | | | | | |
| Polyol A | 93.5 | | 93.5 | | | |
| Polyol B | | 90.5 | | 93.5 | | |
| Polyol C | | | | | 93.5 | |
| Polyol D | | | | | | 93.0 |
| 2-Methyl-1,3-propanediol | 6.0 | 9.0 | | | | |
| 1,4-Butanediol | | | 6.0 | 6.0 | 6.0 | 6.0 |
| Catalyst | 0.5 | 0.5 | 0.5 | 0.5 | 0.5 | 1.0 |
| Isocyanate (wt. %) | | | | | | |
| Isocyanate A | 35.3 | 50.3 | 35.3 | 37.6 | 43.5 | 44.6 |
| Processing conditions | | | | | | |
| Polyol/isocyanate (weight ratio) | 2.83 | 1.99 | 2.83 | 2.66 | 2.30 | 2.24 |
| NCO index | 105 | 105 | 105 | 105 | 105 | 105 |
| Mold temp (°C.) | 70 | 70 | 70 | 70 | 70 | 70 |
| Shot time (min) | 4 | 2 | 4 | 2 | 2 | 2 |
| Demold time (min) | 6 | 5 | 6 | 5 | 6 | 12 |

TABLE 2

| Physical properties | | | | | | |
|---|---|---|---|---|---|---|
| | Example | | | | | |
| | 1 | 2 | 3 | 4 | 5 | 6 |
| Tensile strength (MPa) | 2.61 | 3.75 | 5.82 | 5.50 | 4.02 | 3.66 |
| Elongation (%) | 506 | 270 | 278 | 242 | 119 | 132 |
| Flexural modulus (MPa) | 9.36 | 3.52 | 8.28 | 7.30 | 8.25 | 7.39 |
| Die C tear (N/mm) | 10.85 | 8.98 | 13.28 | 10.54 | 17.33 | 19.08 |
| Split tear (N/mm) | 3.57 | 4.39 | 5.25 | 3.26 | 2.43 | 3.05 |
| Compression set | 6.8 | 0.7 | 12.7 | 12.6 | 11.4 | 10.9 |
| Resilience (mm) | 26 | 9 | 49 | 46 | 22 | 16 |

What is claimed is:

1. A process for preparing polyurethanes having improved elongation and resiliency to compression by the resin transfer molding technique comprising
(A) preparing, at an isocyanate index of 80 to 120, a mixture of
  (a) an organic polyisocyanate;
  (b) 60 to 98 percent by weight, based on the total amount of components (b) and (c), of at least one isocyanate-reactive compound containing at least two isocyanate-reactive hydrogen atoms and having a molecular weight of from 400 to 10,000;
  (c) 2 to 40 percent by weight, based on the total amount of components (b) and (c), of (i) 2-methyl-1,3-propanediol or (ii) a mixture of 2-methyl-1,3-propanediol with (1) up to 30% by weight, based on the total amount of component (c), of a chain extender other than 2-methyl-1,3-propanediol and/or (2) up to 25% by weight, based on the total amount of component (c), of a crosslinking agent; and
  (d) one or more catalysts and, optionally, one or more other auxiliaries and/or additives;
(B) injecting said mixture into a mold over a period of 30 seconds to 15 minutes at a pressure of 0.07 to 0.7 MPa to form a molded material; and
(C) removing the molded material from said mold.

2. A process according to claim 1 wherein the organic polyisocyanate is an aromatic diisocyanate.

3. A process according to claim 1 wherein the organic polyisocyanate is a an isocyanate-containing prepolymer prepared from an aromatic diisocyanate.

4. A process according to claim 1 wherein the isocyanate-reactive compounds is a compound containing 2 to 8 isocyanate-reactive hydroxyl groups.

5. A process according to claim 4 wherein the isocyanate-reactive compound has a molecular weight of from 2000 to 6000.

6. A process according to claim 1 wherein the isocyanate-reactive compounds is a polyether or polyester having on average 2 to 2.2 isocyanate-reactive hydroxyl groups compound.

7. A process according to claim 6 wherein the isocyanate-reactive compound has a molecular weight of from 2000 to 6000.

8. A process according to claim 1 wherein component (c) is 2-methyl-1,3-propanediol.

9. A process according to claim 1 wherein components (b) and (c) consist of, relative to their combined amount, 70 to 95 percent by weight of component (b) and 5 to 30 percent by weight of component (c).

10. A process according to claim 1 wherein catalyst (d) is a delayed-action catalyst.

11. A process according to claim 1 wherein the isocyanate index is 95 to 105.

12. A process according to claim 1 wherein the mold used in step (B) contains a reinforcing material.

13. A process according to claim 1 comprising
(A) preparing, at an isocyanate index of 80 to 120, a mixture of
  (a) an aromatic diisocyanate or an isocyanate-containing prepolymer prepared from an aromatic diisocyanate;
  (b) 70 to 95 percent by weight, based on the total amount of components (b) and (c), of at least one isocyanate-reactive compound containing on average 2 to 2.2 isocyanate-reactive hydroxyl groups and having a molecular weight of from 2000 to 6000;
  (c) 5 to 30 percent by weight, based on the total amount of components (b) and (c), of 2-methyl-1,3-propanediol; and
  (d) a delayed-action catalyst and, optionally, one or more other auxiliaries and/or additives;
(B) injecting said mixture into a mold over a period of 30 seconds to 15 minutes at a pressure of 0.07 to 0.7 MPa to form a molded material; and
(C) removing the molded material from said mold.

* * * * *